United States Patent
Baldwin

(10) Patent No.: US 10,049,051 B1
(45) Date of Patent: Aug. 14, 2018

(54) RESERVED CACHE SPACE IN CONTENT DELIVERY NETWORKS

(71) Applicant: Amazon Technologies, Inc., Seattle, WA (US)

(72) Inventor: Matthew Graham Baldwin, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 14/967,218

(22) Filed: Dec. 11, 2015

(51) Int. Cl.
  *G06F 12/08* (2016.01)
  *G06F 12/0893* (2016.01)
  *G06F 12/0891* (2016.01)

(52) U.S. Cl.
  CPC ...... *G06F 12/0893* (2013.01); *G06F 12/0891* (2013.01); *G06F 2212/1016* (2013.01); *G06F 2212/154* (2013.01)

(58) Field of Classification Search
  CPC ............. G06F 12/0893; G06F 12/0891; G06F 2212/1016; G06F 2212/154
  See application file for complete search history.

(56) References Cited

U.S. PATENT DOCUMENTS

| | | |
|---|---|---|
| 5,063,500 A | 11/1991 | Shorter |
| 5,341,477 A | 8/1994 | Pitkin et al. |
| 5,459,837 A | 10/1995 | Caccavale |
| 5,611,049 A | 3/1997 | Pitts |
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 5/1999 | Russell et al. |
| 5,933,811 A | 8/1999 | Angles et al. |
| 5,937,427 A | 8/1999 | Shinagawa et al. |
| 5,974,454 A | 10/1999 | Apfel et al. |

(Continued)

FOREIGN PATENT DOCUMENTS

| | | |
|---|---|---|
| CA | 2741 895 A1 | 5/2010 |
| CN | 1422468 A | 6/2003 |

(Continued)

OTHER PUBLICATIONS

Office Action in Japanese Application No. 2011-502139 dated Aug. 17, 2015.

(Continued)

*Primary Examiner* — Daniel Tsui
*Assistant Examiner* — Masud Khan
(74) *Attorney, Agent, or Firm* — Knobbe, Martens, Olson & Bear, LLP

(57) ABSTRACT

Systems and methods are described to reserve cache space of points of presence ("POPs") within a content delivery network ("CDN"). A provider may submit a request to the CDN to reserve cache space on one or more POPs for data objects designated by that provider. Thereafter, the CDN may mark those designated data objects within its cache as protected from eviction. When the CDN implements a cache eviction policy on the cache, the protected objects may be ignored for purposes of eviction, or may be evicted only after non-protected data objects.

20 Claims, 8 Drawing Sheets

(56) References Cited

U.S. PATENT DOCUMENTS

| | | |
|---|---|---|
| 5,991,306 A | 11/1999 | Burns et al. |
| 5,999,274 A | 12/1999 | Lee et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 7/2005 | Orbits et al. |
| 6,925,499 B1 | 8/2005 | Chen et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |

(56) References Cited

U.S. PATENT DOCUMENTS

| | | |
|---|---|---|
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,389,354 B1 | 6/2008 | Sitaraman et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,175,863 B1 | 5/2012 | Ostermeyer et al. |

(56) References Cited

U.S. PATENT DOCUMENTS

| | | |
|---|---|---|
| 8,190,682 B2 | 5/2012 | Paterson-Jones et al. |
| 8,195,837 B2 | 6/2012 | McCarthy et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,301,600 B1 | 10/2012 | Helmick et al. |
| 8,301,645 B1 | 10/2012 | Crook |
| 8,321,568 B2 | 11/2012 | Sivasubramanian et al. |
| 8,380,831 B2 | 2/2013 | Barber |
| 8,402,137 B2 | 3/2013 | Sivasuramanian et al. |
| 8,423,408 B1 | 4/2013 | Barnes et al. |
| 8,423,662 B1 | 4/2013 | Weihl et al. |
| 8,433,749 B2 | 4/2013 | Wee et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,619,780 B1 | 12/2013 | Brandwine et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,826,032 B1 | 9/2014 | Yahalom et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,459 B1 | 2/2015 | Scholl |
| 8,966,318 B1 | 2/2015 | Shah |
| 8,972,580 B2 | 3/2015 | Fleischman et al. |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,584,328 B2 | 2/2017 | Graham-cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,554 B2 | 4/2017 | Marshall et al. |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,819,567 B1 | 11/2017 | Uppal et al. |
| 9,832,141 B1 | 11/2017 | Raftery |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 2001/0000811 A1 | 5/2001 | May et al. |

(56) References Cited

U.S. PATENT DOCUMENTS

| | | |
|---|---|---|
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Jun-Hyeong |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminksy et al. |

(56) References Cited

U.S. PATENT DOCUMENTS

| | | |
|---|---|---|
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |

(56) References Cited

U.S. PATENT DOCUMENTS

| | | |
|---|---|---|
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1* | 3/2009 | Elazary .......... G06F 12/12 711/133 |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0138533 A1 | 5/2009 | Iwasaki et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |

(56) References Cited

U.S. PATENT DOCUMENTS

| | | |
|---|---|---|
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0070603 A1 | 3/2010 | Moss et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1* | 12/2010 | Colglazier .......... G06F 12/0891 711/136 |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0307533 A1* | 12/2011 | Saeki ................ G06F 17/3048 707/822 |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0036238 A1 | 2/2012 | Sundaram et al. |
| 2012/0066360 A1 | 3/2012 | Ghosh |
| 2012/0072600 A1 | 3/2012 | Richardson et al. |
| 2012/0078998 A1 | 3/2012 | Son et al. |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |

(56) References Cited

U.S. PATENT DOCUMENTS

| | | |
|---|---|---|
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0224516 A1 | 9/2012 | Stojanovski et al. |
| 2012/0226649 A1* | 9/2012 | Kovacs ............... H04L 67/2842 706/47 |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0246129 A1 | 9/2012 | Rothschild et al. |
| 2012/0254961 A1 | 10/2012 | Kim et al. |
| 2012/0257628 A1 | 10/2012 | Bu et al. |
| 2012/0278831 A1 | 11/2012 | van Coppenolle et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0019311 A1 | 1/2013 | Swildens et al. |
| 2013/0034099 A1 | 2/2013 | Hikichi et al. |
| 2013/0041872 A1 | 2/2013 | Aizman et al. |
| 2013/0046869 A1 | 2/2013 | Jenkins et al. |
| 2013/0054675 A1 | 2/2013 | Jenkins et al. |
| 2013/0055374 A1 | 2/2013 | Kustarz et al. |
| 2013/0067530 A1 | 3/2013 | Spektor et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0086001 A1 | 4/2013 | Bhogal et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0263256 A1 | 10/2013 | Dickinson et al. |
| 2013/0268616 A1 | 10/2013 | Sakata et al. |
| 2013/0279335 A1 | 10/2013 | Ahmadi |
| 2013/0305046 A1 | 11/2013 | Mankovski et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0019605 A1 | 1/2014 | Boberg |
| 2014/0022951 A1 | 1/2014 | Lemieux |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0082165 A1 | 3/2014 | Marr et al. |
| 2014/0082614 A1 | 3/2014 | Klein et al. |
| 2014/0089917 A1 | 3/2014 | Attalla et al. |
| 2014/0108672 A1 | 4/2014 | Ou et al. |
| 2014/0122698 A1 | 5/2014 | Batrouni et al. |
| 2014/0122725 A1 | 5/2014 | Batrouni et al. |
| 2014/0137111 A1 | 5/2014 | Dees et al. |
| 2014/0143320 A1 | 5/2014 | Sivasubramanian et al. |
| 2014/0149601 A1 | 5/2014 | Carney et al. |
| 2014/0164817 A1 | 6/2014 | Bartholomy et al. |
| 2014/0165061 A1 | 6/2014 | Greene et al. |
| 2014/0215019 A1* | 7/2014 | Ahrens ............... H04L 67/22 709/219 |
| 2014/0257891 A1 | 9/2014 | Richardson et al. |
| 2014/0280679 A1* | 9/2014 | Dey ............... H04L 67/2842 709/213 |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 3/2015 | Yum |
| 2015/0074228 A1 | 3/2015 | Drake |
| 2015/0081842 A1 | 3/2015 | Richardson et al. |
| 2015/0088972 A1 | 3/2015 | Brand et al. |
| 2015/0089621 A1 | 3/2015 | Khalid |
| 2015/0154051 A1 | 6/2015 | Kruglick |
| 2015/0156279 A1 | 6/2015 | Vaswani et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188734 A1 | 7/2015 | Petrov |
| 2015/0188994 A1 | 7/2015 | Marshall et al. |
| 2015/0189042 A1 | 7/2015 | Sun et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |
| 2015/0215656 A1* | 7/2015 | Pulung ............ H04N 21/23113 725/93 |
| 2015/0229710 A1 | 8/2015 | Sivasubramanian et al. |
| 2015/0244580 A1 | 8/2015 | Saavedra |
| 2015/0256647 A1 | 9/2015 | Richardson et al. |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028644 A1 | 1/2016 | Richardson et al. |
| 2016/0028755 A1 | 1/2016 | Vasseur et al. |
| 2016/0036857 A1 | 2/2016 | Foxhoven et al. |
| 2016/0041910 A1 | 2/2016 | Richardson et al. |
| 2016/0065665 A1 | 3/2016 | Richardson et al. |
| 2016/0072669 A1 | 3/2016 | Saavedra |
| 2016/0072720 A1 | 3/2016 | Richardson et al. |
| 2016/0088118 A1 | 3/2016 | Sivasubramanian et al. |
| 2016/0132600 A1 | 5/2016 | Woodhead et al. |
| 2016/0134492 A1 | 5/2016 | Ellsworth et al. |
| 2016/0142367 A1 | 5/2016 | Richardson et al. |
| 2016/0182454 A1 | 6/2016 | Phonsa et al. |
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |
| 2016/0294678 A1 | 10/2016 | Khakpour et al. |
| 2016/0308959 A1 | 10/2016 | Richardson et al. |
| 2017/0044128 A1* | 2/2017 | Katsev ............... H04L 67/2852 |
| 2017/0085495 A1 | 3/2017 | Richardson et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0180217 A1 | 6/2017 | Puchala et al. |

(56) References Cited

U.S. PATENT DOCUMENTS

| | | |
|---|---|---|
| 2017/0180267 A1 | 6/2017 | Puchala et al. |
| 2017/0214755 A1 | 7/2017 | Sivasubramanian et al. |
| 2017/0250821 A1 | 8/2017 | Richardson et al. |
| 2017/0257340 A1 | 9/2017 | Richardson et al. |
| 2017/0353395 A1 | 12/2017 | Richardson et al. |

FOREIGN PATENT DOCUMENTS

| | | |
|---|---|---|
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 | 5/2008 |
| JP | 2009-071538 A | 4/2009 |
| JP | 2012-509623 | 4/2012 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2017/106455 A1 | 6/2017 |

OTHER PUBLICATIONS

Third Office Action in Chinese Application No. 201180046104.0 dated Apr. 14, 2016.
Office Action in Japanese Application No. 2015-533132 dated Apr. 25, 2016.
Office Action in Canadian Application No. 2884796 dated Apr. 28, 2016.
Office Action in Japanese Application No. 2015-075644 dated Apr. 5, 2016 in 15 pages.
Office Action in Japanese Application No. 2011-516466 dated May 30, 2016.
Office Action in Russian Application No. 2015114568 dated May 16, 2016.
Office Action in Chinese Application No. 201310537815.9 dated Jul. 5, 2016.
Office Action in Chinese Application No. 201310717573.1 dated Jul. 29, 2016.
Sharif et al, "Secure In-VM Monitoring Using Hardware Virtualization", Microsoft, Oct. 2009 http://research.microsoft.com/pubs/153179/sim-ccs09.pdf; 11 pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Office Action in European Application No. 11767118.0 dated Feb. 3, 2017.
Office Action in European Application No. 09839809.2 dated Dec. 8, 2016.
Office Action in Japanese Application No. 2014-225580 dated Oct. 3, 2016.
Partial Supplementary Search Report in European Application No. 09826977.2 dated Oct. 4, 2016.
Decision of Rejection in Chinese Application No. 201180046104.0 dated Oct. 17, 2016.
Office Action in Canadian Application No. 2816612 dated Oct. 7, 2016.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.

(56) References Cited

OTHER PUBLICATIONS

"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, Sans Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. of Networking 2005, all pages.
Gunther et al, "Measuring Round Trip Times to determine the Distance between WLAN Nodes", Dec. 18, 2004, Technical University Berlin, all pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.

Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _ Basics.html, 4 pages.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information

(56) References Cited

OTHER PUBLICATIONS

Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report for European Application No. 09839809.2 dated May 11, 2015.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Office Action in Japanese Application No. 2014-225580 dated Oct. 26, 2015.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 dated Nov. 19, 2012.
Examination Report in Singapore Application No. 201103333-9 dated Aug. 13, 2013.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
First Office Action in Chinese Application No. 201180053405.6 dated May 3, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Office Action in European Application No. 07754164.7 dated Dec. 14, 2015.
Office Action in Canadian Application No. 2816612 dated Aug. 8, 2017.
Supplementary Examination Report in Singapore Application No. 11201501987U dated May 17, 2017.
Office Action in Chinese Application No. 201310537815.9 dated Jun. 2, 2017.

(56) References Cited

OTHER PUBLICATIONS

International Search Report and Written Opinion in PCT/US/2016/066848 dated May 1, 2017.
International Search Report and Written Opinion in PCT/US2017/055156 dated Dec. 13, 2017.

* cited by examiner

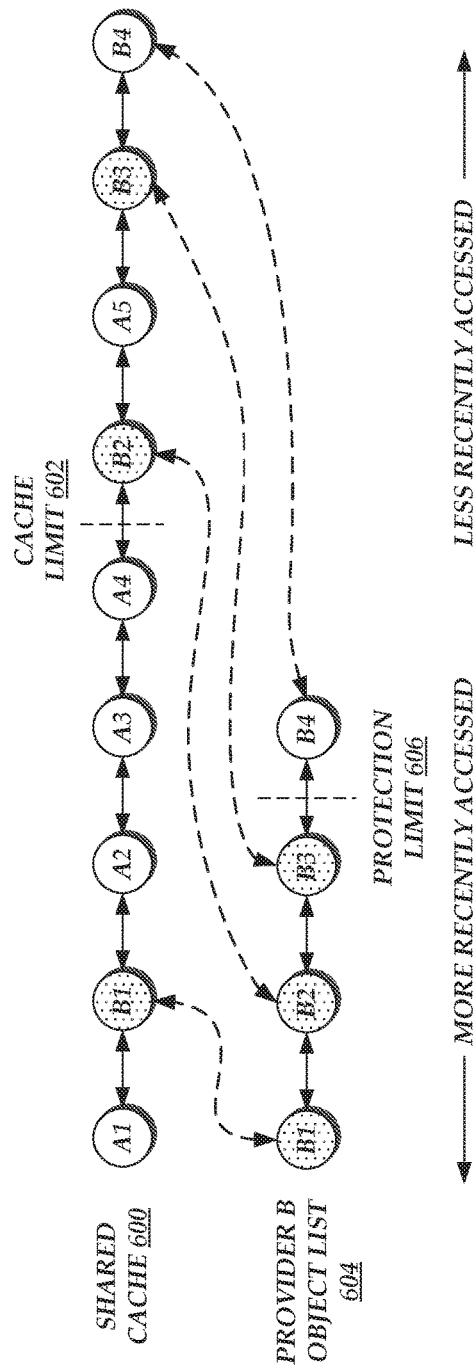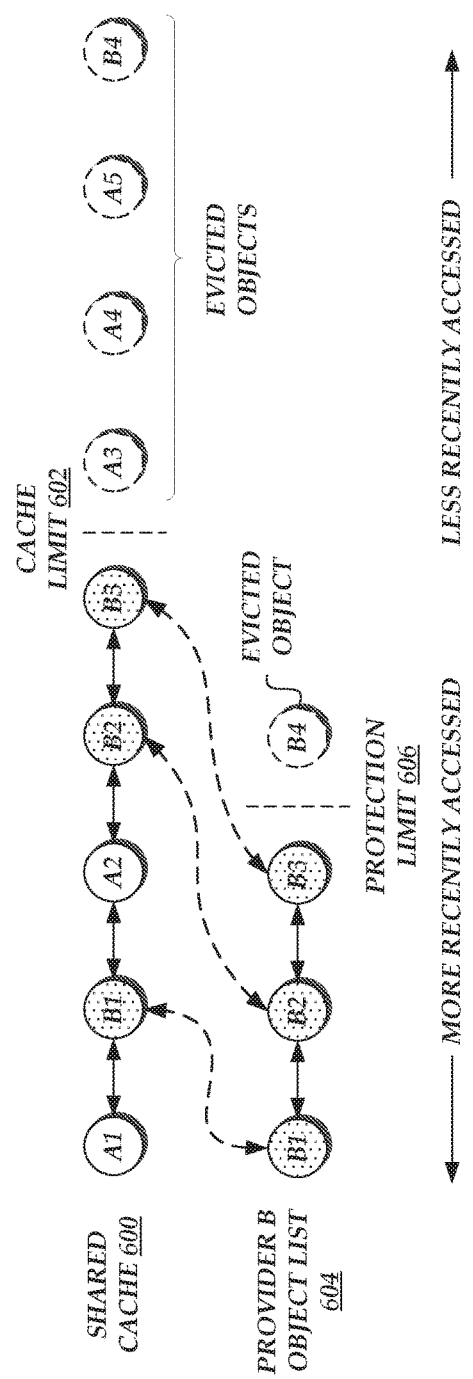

RESERVED CACHE SPACE IN CONTENT DELIVERY NETWORKS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Content providers (such as businesses, artists, media distribution services, etc.) can employ a series of interconnected data centers to deliver content in the form of data objects (e.g., representing web sites, web content, or other digital data) to users or clients. These interconnected data centers are sometimes referred to as "content delivery networks" (CDNs) or content delivery systems. Existing routing and addressing technologies can enable multiple data centers associated with a content delivery system to provide similar or identical data objects to client computing devices. In some instances, each data center providing a set of data objects may be referred to as a point-of-presence ("POP"). A content delivery system can maintain POPs over a wide area (or worldwide) to enable the system to efficiently service requests from clients in a variety of locations.

To utilize a CDN, a content provider generally designates one or more computing devices or data centers (e.g., external to the CDN) to maintain primary copies of data objects, which are sometimes referred to as "origin servers." Each POP within the CDN can maintain all or a portion of the data objects provided by the origin server (e.g., within a data store of the CDN). When a client requests a data object from a POP, the POP can determine whether the requested data object is maintained at the POP. If so, the POP can provide the requested data object to the client directly. If not, the POP may first retrieve the data object from the origin server, and thereafter provide the data object to the client. This process of returning a data object not presently maintained at a POP is sometimes referred to as a "cache miss." Cache misses are generally undesirable, in that they result in delays to fulfill client requests (e.g., due to the time required to retrieve content from the origin server) as well as increased load on the origin server itself.

BRIEF DESCRIPTION OF THE DRAWINGS

FIGS. 6A and 6B are illustrative graphical depictions or visualizations of a cache structure that can be implemented at a POP of FIG. 1 to reserve a portion of a data store at the POP for content associated with the provider;

DETAILED DESCRIPTION

Figure 1:
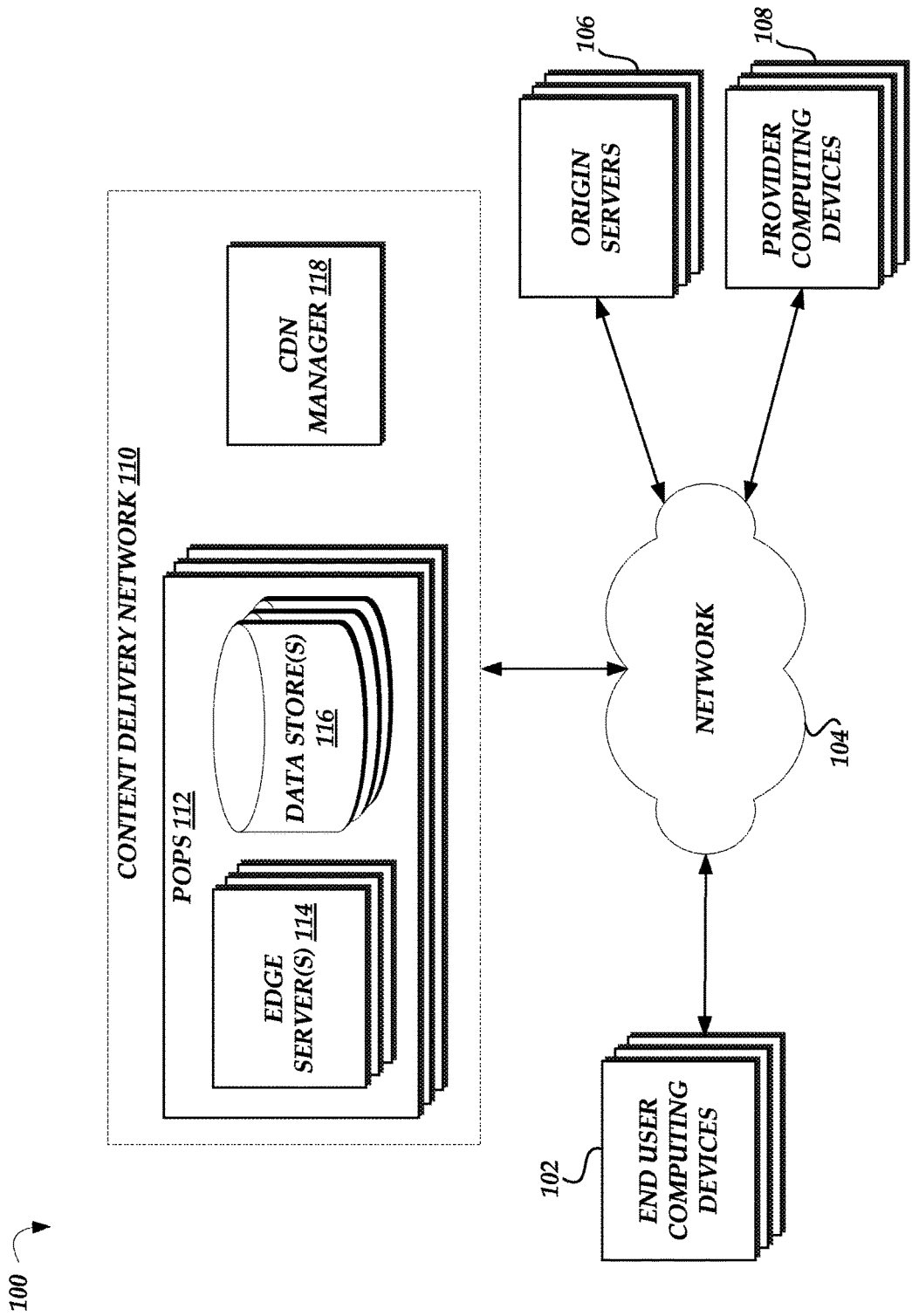
FIG. 1 is a block diagram depicting an illustrative logical network including end user computing devices, provider computing devices, and origin servers, as well as a content delivery network ("CDN") including a CDN manager and multiple POPs.

Generally described, aspects of the present disclosure relate to implementing caches of data objects at points of presence ("POPs") within a content delivery network ("CDN"), where at least a portion of the cache is reserved or designated to hold data objects associated with a specific provider or with a specific set of content. More specifically, embodiments of the present disclosure enable a provider to request that a certain volume of data objects (e.g., n gigabytes) associated with that provider are preferentially stored at a POP, such that the POP deletes or "evicts" non-preferred data objects prior to the preferentially stored data objects, or such that preferentially stored data objects are never deleted from the POP. Accordingly, embodiments of the present disclosure may be utilized to increase the likelihood that data objects of a given provider are retained at a POP, thereby reducing the number of cache misses for those data objects and increasing the performance of the CDN with respect to those data objects.

Illustratively, a POP may generally provide a shared data cache that is shared among multiple providers. The POP may implement a cache eviction policy for the shared data cache, which at least partly defines an algorithm by which data is removed or deleted from the shared data cache. For example, the POP may implement a "least recently used" (LRU) cache eviction policy, which causes the least recently used object within the shared data cache to be removed whenever the total size of objects within the data store exceeds a threshold amount (e.g., 90% of the total capacity of the data store). In such an instance, it is possible that highly popular data objects of a first provider frequently occupy all or a majority of the shared data cache, while less popular data objects of a second provider occupy little or none of the shared data cache. This situation will generally result in high performance for those popular objects of the first provider, but low performance for those less popular objects of the second provider (e.g., due to the time required to handle cache misses).

To remedy this situation, the present application enables a provider to request creation of a reserved cache space at a POP, designated to store data objects of that provider. Each POP may protect data objects placed within the reserved cache space, such that those data objects are retained indefinitely at the POP (unless removed from the reserved cache space), or are evicted only after non-protected data objects.

For example, assume a first provider wishes to guarantee that 1 gigabyte ("GB") of data objects of the first provider is constantly maintained at each POP of a CDN. The first provider may request 1 GB of reserved cache space on the CDN, such that a most-recently-accessed 1 GB of data objects of the first provider are maintained at each POP, regardless of the popularity of data objects of other providers at the POP. In this manner, the first provider can reduce the number of cache misses for data objects of the first provider, increasing delivery time of those data objects to end users, and reducing the number of interactions with the origin service of the first provider.

In one embodiment, a POP may implement reserved cache space for data objects of a provider by marking data objects stored within a shared cache as preferred. For example, when a provider requests 1 GB of reserved cache space, a POP may maintain a list of the most-recently accessed data objects of the provider, and designate the top 1 GB of those data objects as protected (e.g., by assigning a flag to the data objects stored in the shared data cache). As new requests for content of the provider are received and processed, the list of the most-recently accessed data objects of the provider can be updated, for example, such that flags are added to newly accessed data objects, and flags are removed from less recently used data objects that fall outside of the 1 GB data limit. During cache eviction processing on the shared data cache, the POP may skip over or ignore protected data objects, such that those data objects are not evicted from the shared data cache (which may cause more popular, unprotected data objects to be evicted instead). Thus, the top 1 GB most-frequently-accessed data objects of a provider can generally be expected to be available at the POP, regardless of their popularity relative to data objects of other providers.

In another embodiment, a POP may implement reserved cache space for data objects of a provider by creating a separate cache space for that provider. For example, when a provider requests 1 GB of reserved cache space, a POP may allocate a space of at least 1 GB to use as a cache for that provider. Thereafter, data objects of that provider may be cached into the provider-specific cache, rather than a shared data cache used for other providers. Thus, these data objects may be shielded from the cache eviction policies of the shared data cache. Moreover, because the POP maintains a separate provider-specific cache, the provider can be enabled to modify operation of that cache independently from operation of the shared data cache. For example, the provider may provide to the CDN a provider-specific cache eviction policy that at least partly defines an algorithm by which data objects of the provider-specific cache are removed. Illustratively, a provider may specify an algorithm that ranks data objects within the provider-specific cache based on a combination of recency of access and total size of the data objects (e.g., by dividing number of bytes of each data objects by milliseconds since the data object has been accessed at the CDN, and sorting the results). The provider may then specify that data objects be evicted based on that ranking, such that lower ranked data objects are evicted before higher ranked data objects. As a further illustration, the provider may specify that data objects be ranked based on frequency of access, rather than recency of access. For example, a provider may specify that the most frequently accessed data objects over the past n minutes should be retained, even if a different data object has been accessed more recently. A wide variety of other cache eviction policies are known within the art. Thus, by use of a provider-specific cache, individual providers may control the caching operation of the CDN to suit the typical access pattern for their content. In some embodiments, a CDN may include a combination of provider-specific caches and shared data caches.

As will be appreciated by one of skill in the art in light of the description above, the embodiments disclosed herein substantially increase the ability of computing systems, such as CDNs, to rapidly and effectively distribute content to client computing devices. Specifically, the embodiments disclosed herein enable content of individual providers to be preferentially cached at a CDN, such that highly popular data objects of other providers do not cause eviction of the preferentially cached data objects. Such preferential caching reduces the time needed to provide preferentially cached data objects to end users, while reducing the computing resources imposed on origin servers associated with preferentially cached data objects. Thus, the presently disclosed embodiments represent an improvement in the functioning of such CDN systems. Moreover, the presently disclosed embodiments address technical problems inherent within computing systems; specifically, the limited capacity of computing systems to store information, as well as the limited ability of such systems to process network-based requests. These technical problems are addressed by the various technical solutions described herein, including the implementation of reserved cache space at individual POPs of a CDN via designation of protected data objects in a shared data cache and implementation of provider-specific caches. Thus, the present application represents a substantial improvement on existing network systems and computing systems in general.

While the present disclosure generally refers to groupings of data objects based on a provider of those data objects, embodiments of the present disclosure may be utilized to reserve cache space for any set or collection of data objects. For example, embodiments of the present disclosure may enable a provider to reserve cache space within a CDN for a designated set of data objects, such as data objects associated with a single web site or domain name. As a further example, embodiments of the present disclosure may enable cache space on a CDN to be reserved for a defined collection of data objects associated with multiple providers. Accordingly, the present disclosure enables cache space on a CDN to be reserved for any collection of data objects. These collections of data objects may sometimes be referred to as a "distribution" of data objects.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network 100 including multiple end user computing devices 102, origin servers 106, and provider computing devices 108 in communication with a CDN 110 (including a plurality of POPs 112 and a CDN manager 116, each described in more detail below) via a network 104.

While the end user computing devices 102, origin servers 106, and provider computing devices 108 are shown as grouped within FIG. 1, the end user computing devices 102, origin servers 106, and provider computing devices 108 may be geographically distant, and independently owned or operated. For example, the end user computing devices 102 could represent a multitude of users in various global, continental, or regional locations accessing the CDN 110. Further, the origin servers 106 and provider computing devices 108 could represent a multitude of related or distinct parties that have associated with the CDN 110 to provide data objects, representing web sites, multimedia, or other digital, network-deliverable content, to the end user computing devices 102. Accordingly, the groupings of end user computing devices 102, origin servers 106, and provider computing devices 108 within FIG. 1 is intended to represent a logical, rather than physical, grouping. Similarly, each of the components of the CDN 110 may be located within geographically diverse areas. For example, the POPs 112 within the CDN 110 (described in more detail below) may be globally, continentally, or regionally disparate, in order to provide a wide geographical presence for the CDN 110.

Network 104 may be any wired network, wireless network, or combination thereof. In addition, the network 104 may be a personal area network, local area network, wide area network, cable network, satellite network, cellular telephone network, or combination thereof. In the example environment of FIG. 1, network 104 is a global area network (GAN), such as the Internet. Protocols and components for communicating via the other aforementioned types of communication networks are well known to those skilled in the art of computer communications and thus, need not be described in more detail herein. While each of the end user computing devices 102, origin servers 106, provider computing devices 108, and CDN 110 is depicted as having a single connection to the network 104, individual components of the end user computing devices 102, provider computing devices 108, origin servers 106, and CDN 110 may be connected to the network 104 at disparate points. Accordingly, communication times and capabilities may vary between the components of FIG. 1.

End user computing devices 102 may include any number of different computing devices capable of communicating with the CDN 110 to access data objects stored therein or provided by the origin servers 106. For example, individual end user computing devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. Using end user computing devices 102, clients may interact with and access data objects on the CDN 110 originating from or otherwise associated with origin servers 106 associated with various content providers. For example, after requesting a data object, the end user computing devices 102 may be routed to a POP 112 configured to provide that data object on behalf of the origin server 106. Various mechanisms for routing of end user computing devices 102 to POPs 112 within a CDN 110 are known within the art, and thus will not be described in detail herein.

Similarly to the end user computing devices, provider computing devices may include any number of different computing devices capable of communicating with the CDN 110, including laptop or tablet computers, personal computers, wearable computers, servers, personal digital assistants (PDAs), hybrid PDA/mobile phones, mobile phones, electronic book readers, set-top boxes, cameras, digital media players, and the like. Each provider computing device 108 may be operated by or otherwise associated with an entity that has provided one or more data objects to the CDN 110 for subsequent transmission to end user computing devices 102. Such entities are generally referred to herein as "providers."

Origin servers 106 may include any computing device owned or operated by a provider and configured to serve as a primary source for data objects of the provider. For example, origin servers 106 may include servers hosting web sites, streaming audio, video, or multimedia services, data analytics services, or other network-accessible services. The origin servers 106 may include primary versions of data objects, which may be retrieved by various POPs 112 of the CDN 110 for subsequent transmission to the end user computing devices 102.

To receive and handle requests for data objects from end user computing devices 102, the CDN 110 can include a plurality of POPs 112. Each POP 112 may include one or more edge servers 114 collectively configured to maintain all or a portion of the data objects associated with the various providers, as made available by the origin servers 106. As will be discussed in more detail below with respect to FIG. 2, each edge server 114 may include any number of processors, data stores, or networking components operating in conjunction to facilitate retrieval of content. Further, each POP 112 includes a data store 116 of data objects from a variety of providers. Because size of the data store 116 is generally limited, the POP 112 may implement various algorithms or procedures for determining what content should be maintained within the cache, which are sometimes known as "cache eviction policies." Illustratively, each POP 112 may implement a "least recently used" ("LRU") cache eviction policy, which maintains within the cache a set of data objects most recently requested by end user computing devices 102, and evicts less recently used content.

As discussed above, implementation of a shared cache eviction policy can disproportionately affect data objects of different providers. For example, a first provider utilize the CDN 110 to distribute a high amount of consistently accessed data objects, which are therefore likely to be held within the data store 116 as a recently accessed object. A second provider may utilize the CDN 110 to distribute infrequently accessed objects, which are therefore unlikely to be held in the data store 116. Requests for these uncached data objects result in "cache misses," which are generally handled at a POP 112 by initiating a request for the content to a secondary content source (e.g., an origin server 106 associated with the data object). However, as noted above, such processing is often undesirable, as it increases the time (e.g., latency) required to provide the requested data object to the end user computing device 102, and may increase the computing resources needed at the origin server 106.

Because providers may wish to ensure that even infrequently accessed data objects are provided to end user computing devices 102 at a low latency, the CDN 110 may enable a provider to designate at least a portion of the data store 116 as reserved for data objects of that provider. As will be described below, one embodiment of this disclosure enables portions of the data store 116 to be reserved for a provider by protecting data objects of that provider that are stored within the data store 116, up to a size limit (e.g., n GB). Another embodiment of this disclosure enables portions of the data store 116 to be reserved for a provider by creating a logically separate cache within the data store 116 that stores only data objects of that provider, and which may be customized for the provider by implementing provider-specific cache eviction policies. In both such embodiments, the CDN may generally ensure that data objects of the provider are maintained at each POP 112 up to a threshold amount (e.g., n GB), regardless of the frequency at which other data objects are accessed at the POPs 112.

To facilitate reservation of portions of the data stores 116 by a provider, the CDN 110 can further include a CDN manager 118 device. As will be described in more detail below, the CDN manager 118 may obtain requests from provider computing devices 108 to reserve portions of data store 116 on the POPs 112, and interact with the POPs 112 to implement reservation of space within the data store 116 as well as any customizations to operation of the POPs 112 requested by the provider (e.g., implementation of a custom cache eviction policy).

The components of the CDN 110, including the POPs 112 and CDN manager 118 may communicate via a network, such as the network 104 or another private network (not shown in FIG. 1). Such a private network may include any combination of various network types described above operated on behalf of the CDN 110, alone or in conjunction with other services. The private network in some instances may be physically co-mingled with the network 104. For example, the private network may be formed by one or more leased lines on the network 104 that provide dedicated communications to the CDN 110.

It will be appreciated by those skilled in the art that the CDN 110 may have fewer or greater components than are illustrated in FIG. 1. For example, the CDN 110 may include or be in communication with a hosted service environment including one or more rapidly provisioned and released computing resources, such as computing, networking and/or storage devices. A hosted computing environment may also be referred to as a cloud computing environment. Such a cloud computing environment may provide the CDN 110 with access to additional computing resources, such as data storage devices, that may be utilized on-demand by the components of the CDN 110 to dynamically increase the computing resources available to the CDN 110. In one embodiment, components of the CDN 110 shown in FIG. 1 may be implemented wholly or in part by virtual machine instances implemented on physical computing devices within the cloud computing environment. Thus, the number of edge servers 114 or data stores 116, as well as the computing resources available to those edge servers 114 or data stores 116, may be modified during operation of the CDN 110 according to the needs and configuration of the CDN 110. Thus, the depiction of the CDN 110 in FIG. 1 should be taken as illustrative. Further, any one or more of the POPs 112 and CDN manager 118 may be embodied in a plurality of components, each executing an instance of the respective POPs 112 and CDN manager 118. A server or other computing component implementing any one of the respective POPs 112 and CDN manager 118 may include a network interface, memory, processing unit, and computer readable medium drive, all of which may communicate with each other by way of a communication bus. The network interface may provide connectivity over the network 104 and/or other networks or computer systems. The processing unit may communicate to and from memory containing program instructions that the processing unit executes in order to operate the respective POPs 112 and CDN manager 118. The memory may generally include RAM, ROM, other persistent and auxiliary memory, and/or any non-transitory computer-readable media.

Figure 2:
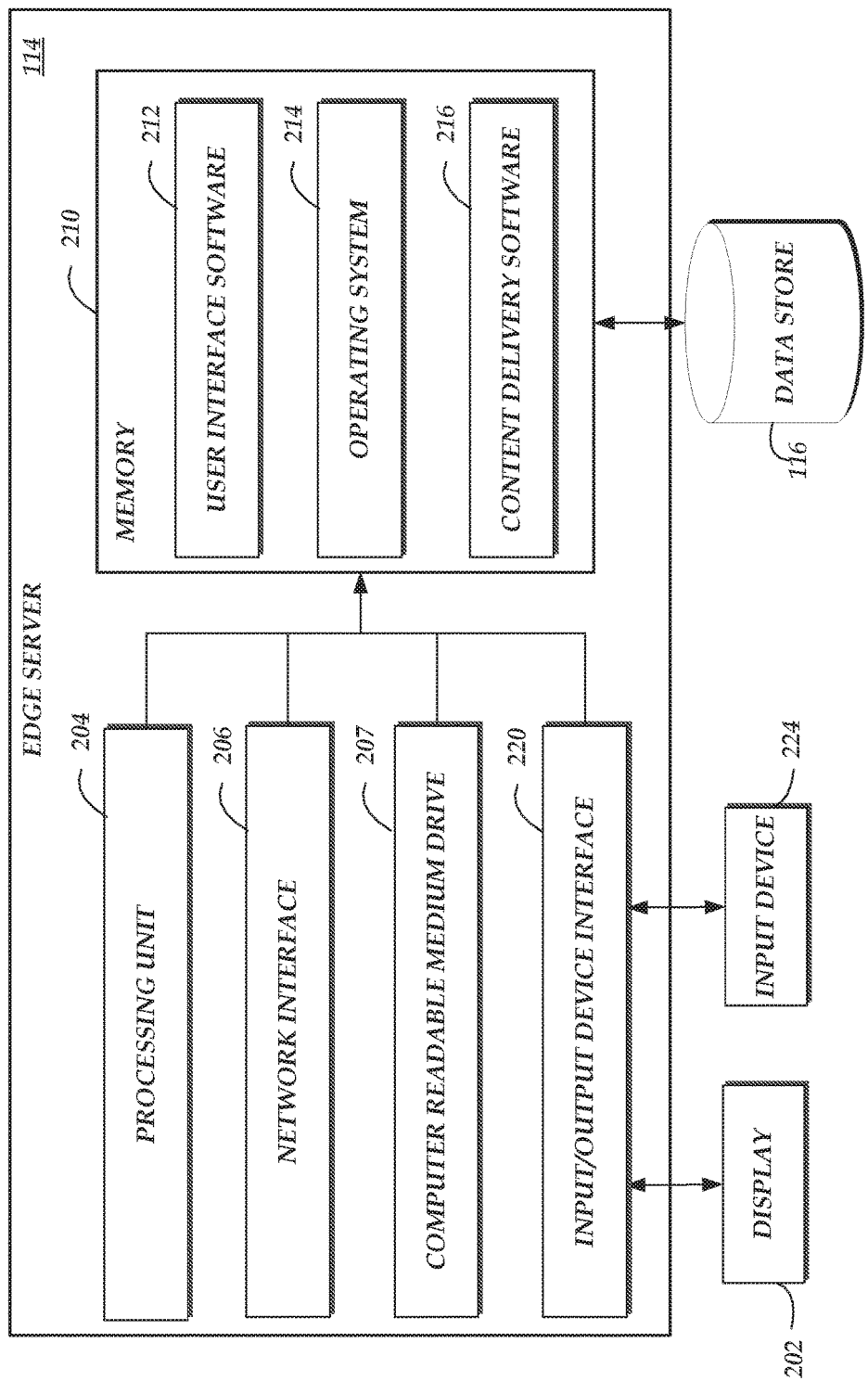
FIG. 2 is a block diagram depicting an illustrative configuration of one embodiment of a server implementing functionalities of a POP of FIG. 1.

FIG. 2 depicts one embodiment of an architecture of an edge server 114 described herein. The general architecture of server 114 depicted in FIG. 2 includes an arrangement of computer hardware and software components that may be used to implement aspects of the present disclosure. As illustrated, the server 114 includes a processing unit 204, a network interface 206, a computer readable medium drive 207, an input/output device interface 220, a display 202, and an input device 224, all of which may communicate with one another by way of a communication bus. The network interface 206 may provide connectivity to one or more networks or computing systems, such as the network 104 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 114 may include more (or fewer) components than those shown in FIG. 2. For example, some embodiments of the server 114 may omit the display 202 and input device 224, while providing input/output capabilities through one or more alternative communication channels (e.g., via the network interface 206). While shown as a single device, each POP 112 may include a set of distinct servers 114 collectively operating to implement the functionality described herein.

The memory 210 may include computer program instructions that the processing unit 204 executes in order to implement one or more embodiments of the present disclosure. The memory 210 generally includes RAM, ROM and/or persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as the data store 116. The data store 116 may be any persistent or substantially persistent storage device (e.g., a hard disk drive, solid state disk drive, flash memory, etc.) utilized to store data objects of various providers or other information utilized by the server 114. In some instances, the data store 116 may include a collection of devices, which may vary according to the storage space required at the data store 116. For example, the data store 116 may be implemented as a logical storage device on a distributed storage system that provides a dynamic storage space (e.g., distributed across a number of physical storage devices) according to the requirements of the data store 116.

In addition to the user interface module 212, the memory 210 may include content delivery software 216 that may be executed by the processing unit 204. In one embodiment, the content delivery software 216 implements various aspects of the present disclosure, including processing requests for content cached at a POP 112 associated with the server 114 (e.g., by use of the data objects stored within the data store 116), retrieval of data objects from other content sources (e.g., origin servers 106) when such data objects are not stored within the data store 116, and maintenance or management of the data objects within the data store 116. As described in more detail below, such maintenance or management may include reserving a portion of the data store 116 for certain data objects, such as data objects of a specific provider, by protecting data objects placed within a shared cache of the data store 116, implementing a provider-specific cache within the data store 116, or both.

Figure 3:
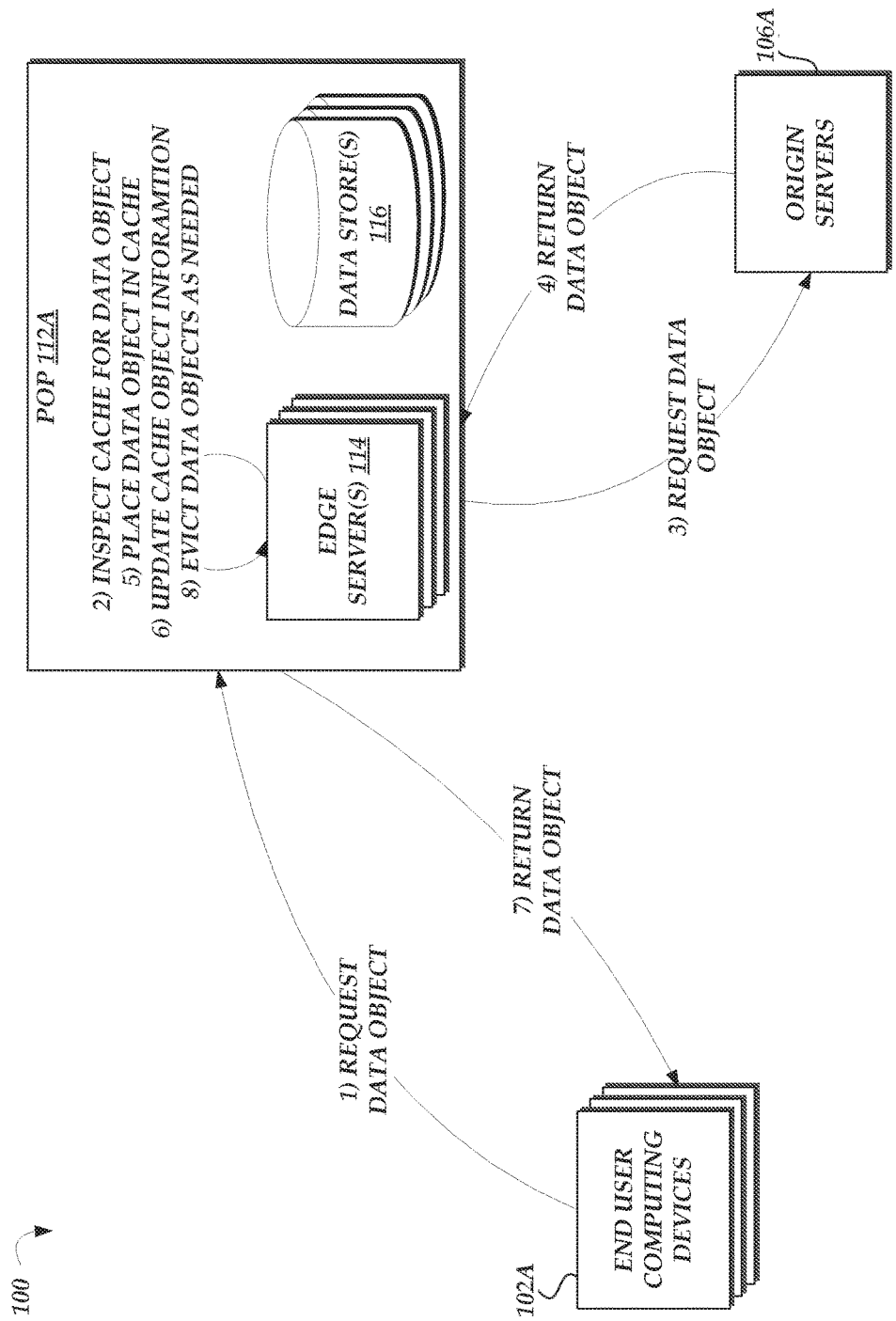
FIG. 3 is a block diagram depicting interactions between an end user computing device and a POP of FIG. 1 to retrieve content from the CDN.

With reference to FIG. 3, an illustrative set of interactions are depicted for servicing client requests for data objects at an individual POP 112A within the CDN 110 of FIG. 1, utilizing a shared data cache (e.g., without reserving portions of the cache for data objects of individual providers).

The interactions begin at (1), where an end user computing device 102A submits a request to a POP 112A for a data object (e.g., a data file associated with a URI, such as a particular image, web site, multimedia content, etc.). Initial routing of such requests to POPs 112 of a CDN 110 is known in the art, and thus will not be described in detail herein.

At (2), the POP 112A assigns an edge server 114A to inspect the one or more data stores 116 and determine whether the data object is cached at the POP 112A. In one embodiment, the POP 112A may assign an edge server 114A based on load balancing techniques, such as by selecting an edge server 114A with currently unused or underused capacity. In another embodiment, the POP 112A may assign an edge server 114A based on an expected access of the edge server 114A to the requested data object. For example, the POP 112A may assign individual edge servers 114A responsibility to various data objects based on a circular hashing algorithm, examples of which are known in the art. Accordingly, the POP 112A may generate a hash value for the requested data object (e.g., by processing an identifier of the data object according to a hash algorithm), and determine which edge server 114 has been assigned responsibility for the data object. Thereafter, the edge server 114A may inspect one or more of the data stores 116 to determine whether the data object is stored therein. In the instance that the data object is stored within the data stores 116, the POP 112A can retrieve and return the data object to the end user computing device 102A.

For the purposes of discussion, it will be assumed that the requested data object is not stored in the data stores 116, and thus would be retrieved from a distinct content source before being returned to the end user computing device 102A. Accordingly, at (3), an edge server 114A of the POP 112A transmits a request to an origin server 106A associated with the requested data object (e.g., as designated to the POP 112A by a provider of the data object). At (4), the origin server 106A returns the data object to the edge server 114. The edge server 114 then stores the data object within the data stores 116, such that subsequent requests for the data object can be serviced from the data stores 116 so long as the data object resides therein. In addition, at (6), the edge server 114 can update information regarding data objects placed within the data stores 116 to reflect the addition of the requested data object. Illustratively, the edge server 114 may update a list of the least recently used objects within the data stores 116 (an "LRU list"), which may later be used by the edge server 114 to evict data objects from the data stores 116. The requested data content is also returned to the end user computing device at (7).

In addition, at (8), the edge server 114 can inspect information regarding data objects within the data stores 116 to evict data objects as needed based on the configuration of the POP 112A. For example, the POP 112A may be configured to ensure that a threshold amount of space exists on one or more of the data stores 116, such that newly requested data objects can be placed therein. This threshold amount of space may be absolute (e.g., n GB) or relative (e.g., 10% of the total size of a data store 116). In the instance that the threshold amount of space is not available on a data store 116, an edge server 114 may implement a cache eviction policy that selects one or more data objects from the data store 116 for deletion. For the purposes of the present description, it will be assumed that data objects are generally evicted the data store 116 according to a least recently used eviction policy, such that a least recently used data object in the data store 116 is continuously deleted until the threshold amount of space becomes available in the data store 116. However, other cache eviction policies, such as eviction of the least frequently used data object or eviction of a random data object, may be utilized by the data store 116.

Figure 4A:
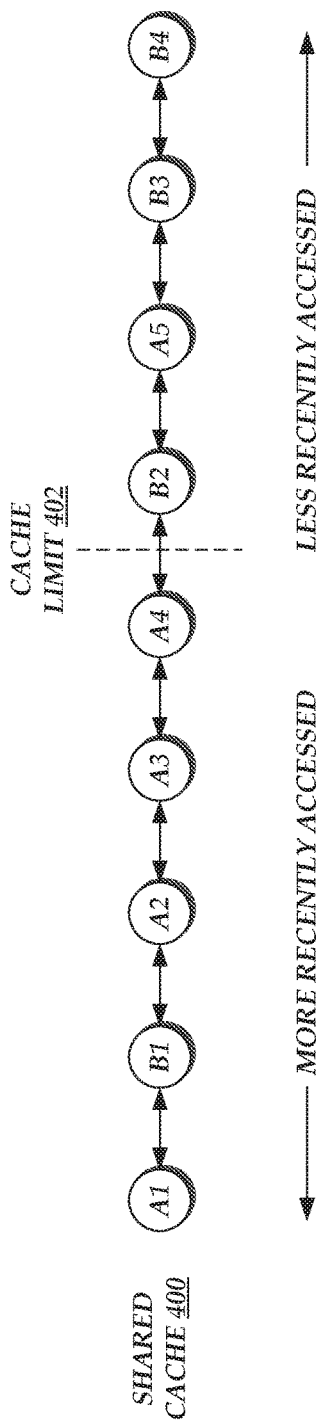
FIGS. 4A and 4B are illustrative graphical depictions or visualizations of a shared cache implemented at a POP of FIG. 1, which maintains a listing of objects sorted according to recency of access, before and after cache eviction.
Figure 4B:
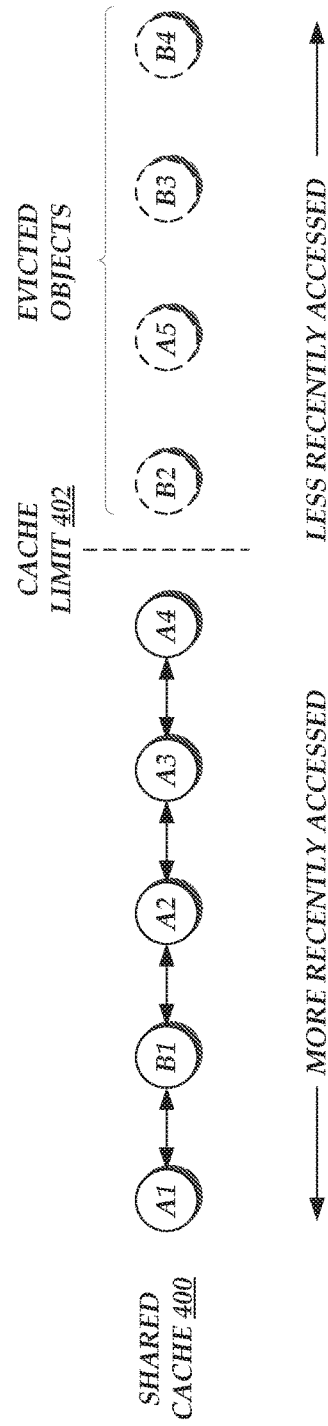

With reference to FIGS. 4A and 4B, graphical illustrations or visualizations of the data objects in a shared cache 400 (e.g., implemented by data store 116 of the POP 112A of FIG. 3) will be described. Specifically, FIG. 4A depicts various data objects within the shared cache 400 prior to eviction, while FIG. 4B depicts the various data objects within the shared cache 400 after eviction. The data objects shown in FIGS. 4A and 4B are illustratively representative of data objects provider by two providers: provider 'A' and provider 'B.' Accordingly, the data objects of FIGS. 4A and 4B are labeled according to their respective provider as well as a number indicating their order within FIGS. 4A and 4B. While these reference numbers are shown for simplicity within FIGS. 4A and 4B, data objects may be identified according to any identifier, such as a universally unique identifier (UUID), URI, etc.

In FIGS. 4A and 4B, the data objects stored within the shared cache 400 are represented in order of recency of access, for example by a doubly linked list, which identifies each data object, as well as a data object (if any) accessed more recently than the given data object and a data object accessed less recently that the given data object. For example, in FIG. 4A, data object 'A1' is depicted as the most recently accessed data object in the shared cache 400, followed by data objects 'B1,' 'A2,' etc. The use of a doubly linked list to represent the order of access of data objects may be beneficial, for example, because the order of data objects in the list may be modified by rearrangement of the pointers between data objects, without requiring a change to the location in the shared cache 400 at which each data object is stored. In addition or alternatively to a doubly linked list, data objects may be organized within the shared cache 400 according to any number of data structures, such as heaps, trees, arrays, hash tables, graphs, etc. Many varieties of data structures other data structures are known in the art, and may be utilized to organize or associate the data items within the shared cache 400 or the other caches described herein.

The shared cache 400 in FIGS. 4A and 4B is associated with a cache limit 402, visually depicted as a dashed line. This cache limit 402 represents the number of data objects that can be held within the shared cache 400 while still allowing the shared cache 400 to maintain a threshold amount of free space (e.g., n GB of free space, a certain percentage of free space, etc.). For ease of description, the cache limit 402 of FIGS. 4A and 4B is shown as limiting the cache to five data objects, each of which is assumed to be roughly equal in size. However, some embodiments of the present application may establish cache limit 402s that account for variation in size of given data elements, such that any number of data elements may be included within the shared cache 400 so long as the collective size of those data elements does not exceed a threshold limit.

In FIG. 4A, a number of data objects are shown as exceeding the cache limit 402, including data objects 'B2,' 'A5,' 'B3,' and 'B4.' Accordingly, a computing device (e.g., an edge server 114 of FIG. 1) may modify the shared cache 400 to evict one or more data objects, such that the cache limit 402 is not exceeded. Illustratively, the computing device may implement a "least recently used" cache eviction policy, which removes data in order of recency of access. As such, the computing device may designate the four least recently accessed data objects (data objects 'B2,' 'A5,' 'B3,' and 'B4') for eviction and subsequent deletion from the shared cache 400. The state of the shared cache 400 after this eviction is shown in FIG. 4B, where the four least recently accessed data objects have been evicted, such that cache limit 402 of the shared cache 400 is not exceeded.

As shown in FIGS. 4A and 4B, the cache eviction policy described above disproportionately favors the data objects of provider 'A' over those of provider 'B,' because those data objects have been more recently accessed in the shared cache 400. In the instance that this preferential treatment occurs frequently, provider 'B' may lose a substantial portion of the benefits of the CDN 110, as requests for data objects of provider 'B' often result in cache misses. To alleviate this issue, embodiments present disclosure enable a provider, such as provider 'B,' to request that a portion of the cache within each POP 112 of a CDN 110 be reserved for data objects of that provider.

One set of interactions for reserving portions of the cache within each POP 112 of a CDN 110 for data objects of a specific provider will be described with reference to FIG. 5. Specifically, the interactions of FIG. 5 enable reservation of cache space at a POP 112 for a provider by protecting data objects of that provider that are placed in a shared cache 400. Thus, data objects of the provider may be protected without requiring that those data objects be maintained separately from data objects of other providers.

Figure 5:
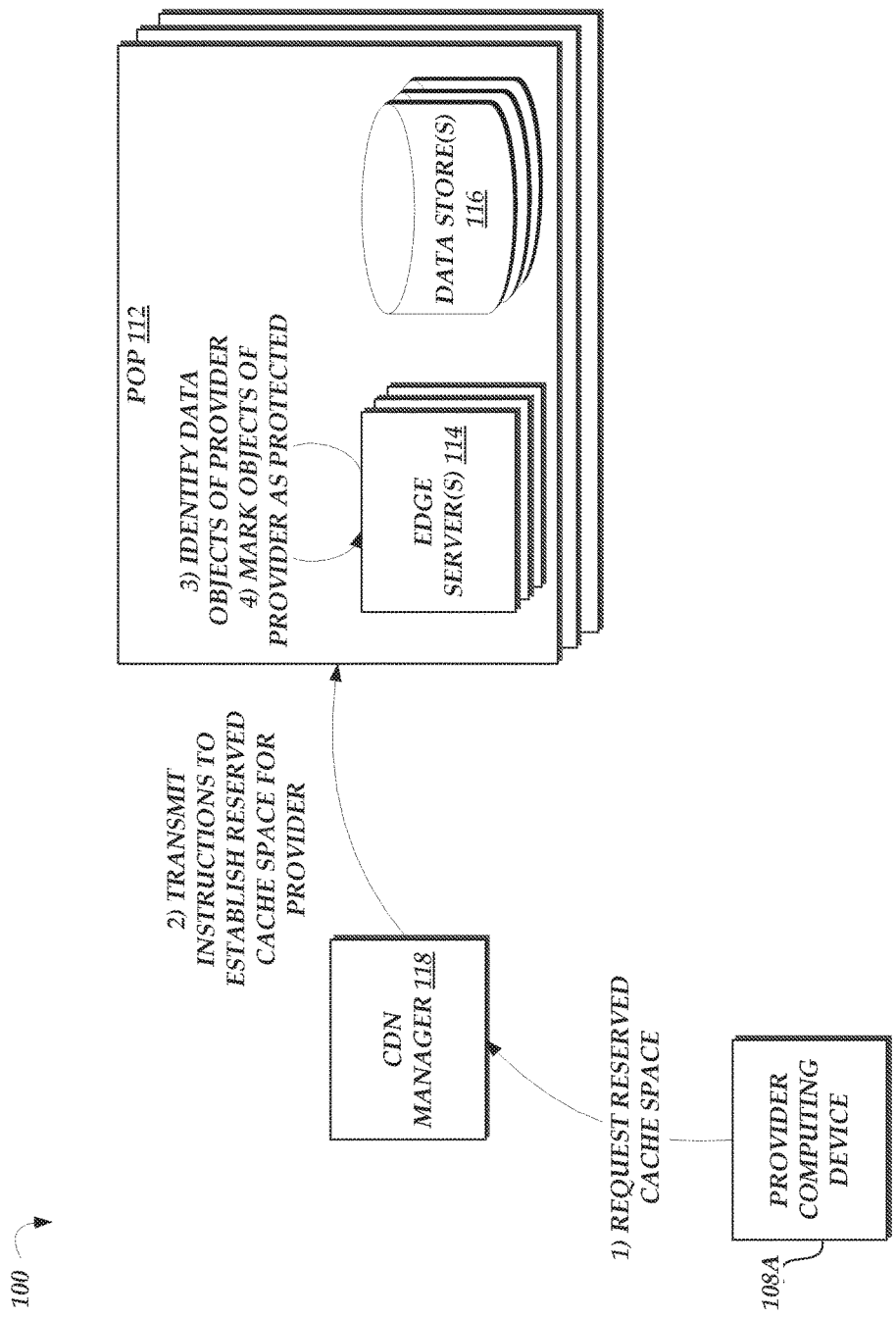
FIG. 5 is a block diagram depicting interactions between a provider computing device and a POP of FIG. 1 to reserve a portion of a data store at the POP for content associated with the provider.

As shown in FIG. 5, a provider computing device 108A may, at (1), transmit a request to the CDN manager 118 to establish a reserved cache space. This request may specify, for example, the amount of space to be reserved (e.g., n GB), as well as the specific POPs 112 that the reserved cache space should be implemented on. The CDN manager 118, in turn, instructs the various POPs 112 of the CDN 110 to establish the reserved cache space for the provider, at (2). In one embodiment, these instructions are transmitted to all POPs 112 of the CDN 110. In another embodiment, these instructions are transmitted to only select POPs 112, such as POPs 112 designated by the provider computing device 108A in the initial request.

At (3), the edge servers 114 of each receiving POP 112 identifies data objects that should be protected from eviction based on the requested reservation of space. Illustratively, where the POP 112 implements a LRU eviction policy, the edge servers 114 may locate a set of most recently accessed objects of the provider (e.g., as associated with the provider computing device 108A), up to the size of the requested reserved cache space. The edge servers 114 can then mark or otherwise designate those data objects within the located set as protected from eviction (e.g., by modifying a flag associated with the data object in the data stores 116), at (4). Thereafter, protected data objects may be ignored (or not preferred relative to unprotected data objects) for the purposes of eviction of data objects from the data stores 116. Thus, a reserved cache space may be established within the data stores 116 for data objects of the provider, without requiring those data objects to be segregated from other data objects handled by the POPs 112.

In one embodiment, identification of protected data objects and designation of those data objects as protected may occur independently of other operations of the POP 112, based on the instructions from the CDN manager 118 to establish a reserved cache space for the provider. In another embodiment, identification of protected data objects and designation of those data objects as protected may occur during other operations of the POP 112, such as fulfillment of client request for data objects of the provider. Illustratively, as new data objects of the provider are placed in to the cache caches 116 of the POP 112, these objects may be marked as protected by the edge servers 114 (e.g., as the most recently accessed objects of the provider). Similarly, a set of least recently used data objects of the provider that do not fall within the reserved space for the provider (e.g., n GB) may be marked as unprotected, and thus available for eviction in accordance with the normal operation of the POP 112.

One of ordinary skill in the art will appreciate that additional interactions may occur within the context of FIG. 5 that are not explicitly shown therein. For example, in one embodiment, the POP 112 may be configured to ensure that requests for reserved cache space do not reduce the generally available cache space at the POP 112. Accordingly, the POP 112 may interact with the data stores 116 to expand the amount of storage available to the POP 112 by the amount of reserved cache space requested. For example, where a provider requests that 5 GB of cache space at the POP 112 be reserved for data objects of that provider, the POP 112 may increase the size of its own data cache on the data stores 116 by 5 GB, to ensure that storage of data objects of other providers are not negatively affected by the reservation of space. In some instances, the data stores 116 may be implemented as a dynamic logical device hosted by one or more physical data stores. Accordingly, the POP 112 may also increase the size of the data stores 116 (e.g., by requesting that more physical data stores be provisioned and added as part of the dynamic logical device).

With reference to FIGS. 6A and 6B, graphical illustrations or visualizations of how a reserved cache space for a provider (provider 'B') may be established within a shared data cache (e.g., implemented by data store 116 of the POP 112A of FIG. 3) will be described. Specifically, FIG. 6A depicts various data objects within a shared cache 600 prior to eviction, as well as a logical list 604 of data objects associated with provider 'B' within that shared cache 600. FIG. 6B depicts various data objects within a shared cache 600 prior after eviction, as well as the logical list 604 of data objects associated with provider 'B' within that shared cache 600 after eviction.

As in FIGS. 4A and 4B, above, the data objects of FIGS. 6A and 6B are labeled according to their respective provider as well as a number indicating their order within FIGS. 6A and 6B. Further, as in FIGS. 4A and 4B, the data objects of FIGS. 6A and 6B stored within the shared cache 600 are represented in order of recency of access by a doubly linked list (e.g., generated by an edge server 114 of FIG. 1), which identifies each data object, as well as a data object (if any) accessed more recently than the given data object and a data object accessed less recently that the given data object.

In FIGS. 6A and 6B, a list 604 of data objects associated with provider B is also shown, illustrating a recency of access of the various data objects associated with the provider B. Illustratively, the list 604, like the list of objects in the shared cache 600, may represented as a doubly linked list (e.g., generated by an edge server 114 of FIG. 1), to facilitate easy addition, removal, and rearrangement of the various data objects within the list 604. While the data objects in the list 604 are shown as distinct from the objects in the shared cache 600, these data objects need not be duplicated in the underlying data storage used to implement the shared cache 600 and list 604. Instead, the shared cache 600, the list 604, or both, may be composed of links or pointers to data objects stored within an underlying memory storage device, such that only one copy of any given data object need be maintained in that device. Because data objects in both the shared cache 600 and the list 604 are intended to represent the same data object, those objects are shown in FIGS. 6A and 6B as connected via dashed lines.

As shown in FIGS. 6A and 6B, the data objects of provider B are associated with a protection limit 606, which limits the number of data objects of provider B that may be protected from eviction within the shared cache 600. This protection limit 606 is graphically shown in FIGS. 6A and 6B as occurring at a fixed point within the list 604 of data objects associated with provider B (e.g., after the first three objects within that linked list). However, in some embodiments, the protection limit 606 may additionally or alternatively be based on the attributes of the specific objects within the list. For example, the protection limit 606 may be set to occur after objects in the list 604 exceed a specified size (e.g., the size of reserved cache space implemented for provider B).

Because a number of data objects for provider B fall below the protection limit 606, including data objects B1-B3, these data objects can be marked (e.g., by an edge server 114) as protected within the shared cache 600. Thus, an edge server 114 or other computing device implementing the data structures depicted in FIGS. 6A and 6B may modify data objects B1-B3 to designate them as protected within the shared cache 600, such as by modifying a flag associated with data objects B1-B3. Thereafter, when a cache eviction policy is applied to the shared cache 600, those data objects designated as protected may be ignored, or may be evicted only after all non-protected data objects have been evicted.

Illustratively, assume that the edge server 114 or other computing device implementing the data structures depicted in FIGS. 6A and 6B implements an LRU eviction policy. As shown in FIG. 6A, the shared cache 600 includes multiple data objects over the eviction limit, and thus, this LRU eviction policy may be run on the shared cache 600. Accordingly, the edge server 114 may traverse the linked list of the shared cache 600 in reverse order to select the least recently used and unprotected data object for eviction. Initially, that object may be data object B4, the last item within the linked list. Because the shared cache 600 would still include more data objects than is allowed by the cache limit 602, the edge server 114 may a next least recently used and unprotected data object for eviction. While data object B3 would generally be the next least recently used data object in the general queue, the edge server 114 may ignore data object B3 for the purposes of eviction, because that data object has been designated as protected. Thus, the edge server may select data object A5 for eviction. This selection may continue until the size of the shared cache 600 no longer exceeds the cache limit 602.

A representation of the shared cache 600 of FIG. 6A after eviction is shown in FIG. 6B. Specifically, the visualization of the shared cache 600 in FIG. 6B depicts the state of the shared cache 600 after four objects (A3-A5 and B4) have been evicted according to the eviction policy described above. Similarly, the list 604 of data objects associated with provider B has been updated to reflect that data object B4 has been evicted from the shared cache 600. When the visualizations FIGS. 6A and 6B are compared to those of FIGS. 4A and 4B, it can be seen that implementation of reserved cache space within the shared cache 600 has a large effect on the data objects within that shared cache 600 after eviction. Both the shared cache 400 (of FIGS. 4A and 4B) and the shared cache 600 (of FIGS. 6A and 6B) begin with the same collection and arrangement of data objects, and are processed according to a LRU eviction policy. However, the shared cache 400, after eviction, includes predominately data objects of provider A. In contrast, the shared cache 600, after eviction, includes predominately data objects of provider B. Thus, reservation of portions of a shared cache 600, as depicted and described in FIGS. 5-6B, can greatly increase the likelihood that objects of a provider are maintained within a cache of a POP 112, thereby increasing performance for end user computing devices 102 seeking to access those data objects and reducing the computing resources required at an origin server of the provider.

While FIGS. 5-6B are described with respect to a single provider, the interactions and visualizations shown therein may be modified to enable reservation of cache space for any number of providers. Illustratively, the interactions of FIG. 5 may be repeated for each of a plurality of providers, such that a set of most recently used data objects that fall within the protection limit of each provider is marked as protected within the caches of various POPs 112. The POP 112 may maintain a list of data objects associated with each such provider, and continuously update those lists as data objects are accessed on the POP 112. Because each such list utilizes relatively little memory (e.g., as a series of pointers), each POP 112 may be capable of maintaining a large number of lists concurrently, and may potentially maintain such a list for each provider of data objects associated with the POP 112. Thus, the description provided above with respect to FIGS. 5-6B may be applied to maintain reserved cache space for any and potentially all providers of data objects associated with the POP 112.

One of skill in the art will appreciate that the results of eviction shown in FIG. 6B may be disadvantageous to providers that are not associated with reserved cache space. For example, reservation of space for provider B may result in eviction of a larger number of data objects of provider A than would otherwise occur under the eviction policy of the POP 112. In some embodiments, POPs 112 may be configured to reduce or eliminate this disadvantageous results by expanding a cache limit of the shared cache in an amount equal to or exceeding the amount of space reserved for data objects of various providers. Such expansion may include, for example, increasing the size of an underlying dynamic logical storage device on which the shared cache is implemented. For example, where a provider B requests that n GB of space be reserved within a shared cache of a POP 112, the POP 112 may also increase space available for that shared cache by n GB. This modification to the cache limit can be used to ensure that reservation of objects for a specific provider does not modify the eviction rate of other, non-reserved data objects. For example, with reference to FIGS. 6A and 6B, one of skill in the art will appreciate that if the cache limit 602 was increased by three objects (equal to the protection limit 606), data objects A3-A5 would be retained in the shared cache 600. Thus, the state of the shared cache 600 after eviction would be identical to the shared cache 400 after eviction with respect to the data objects of provider A.

In some embodiments, increasing a cache limit of a POP 112 may require that additional computing resources be allocated to an underlying data storage device (e.g., data stores 116 of FIG. 1). In such embodiments, the POP 112 may be configured to allocate such additional computing resources from a cloud computing environment or other on-demand resource allocation environment in communication with the POP 112.

Figure 7:
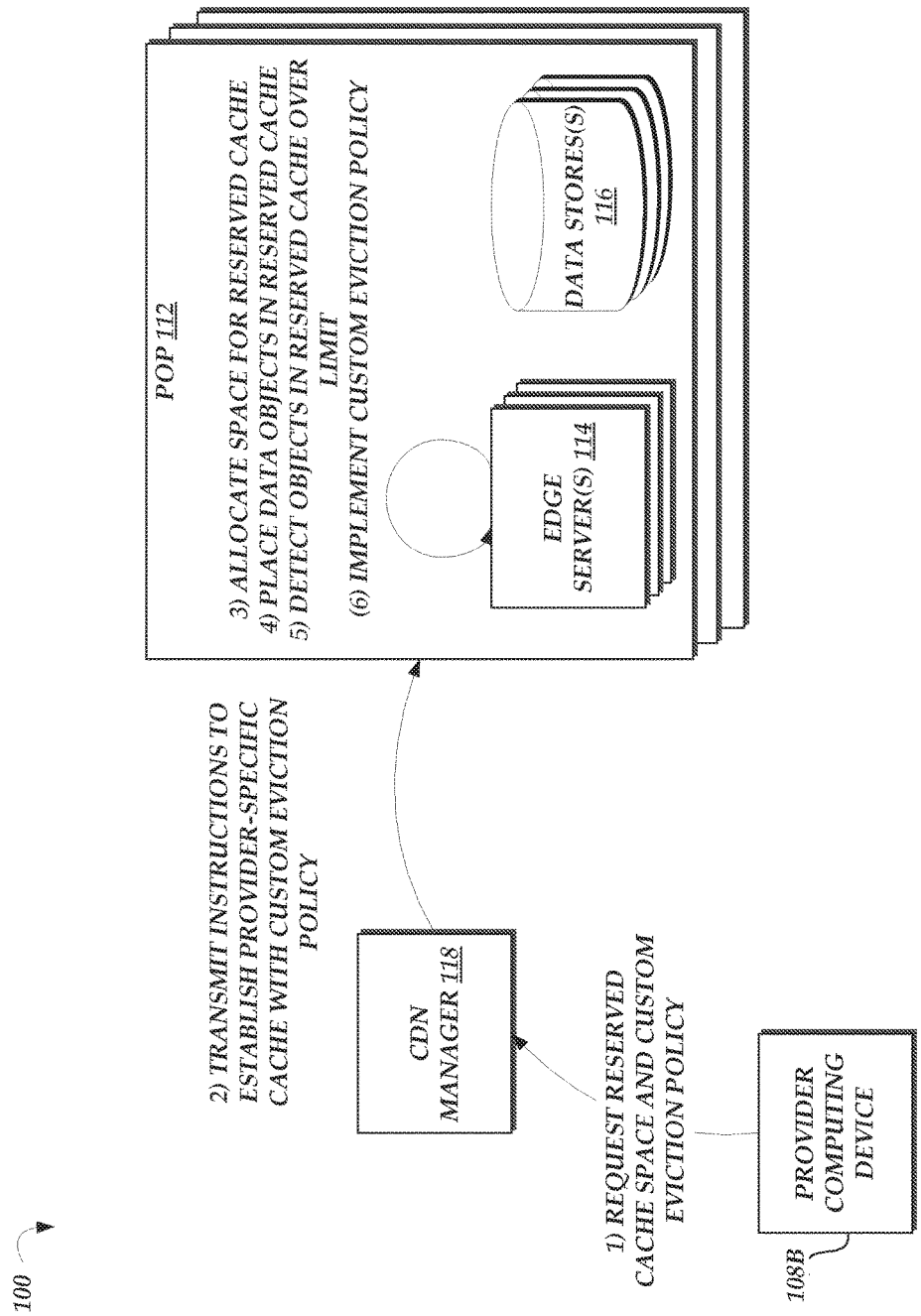
FIG. 7 is a block diagram depicting interactions between a provider computing device and a POP of FIG. 1 to create a provider-specific data case at the POP that utilizes a custom cache eviction policy.

With reference to FIG. 7, an additional or alternative set of interactions for implementing reservation of cache space at a POP 112 will be described. Specifically, the interactions of FIG. 7 may be implemented within a CDN 110 to generate a separate, provider-specific data cache for a provider within the data stores 116, such that data objects placed within the separate data cache are not subject to the eviction policies of a shared data cache. As in the embodiments described above with references to FIGS. 5-6B, the data objects of the provider may therefore be protected from eviction. However, by implementing a separate, provider-specific data cache for a provider within the data stores 116, additional options may be made available to the provider for managing that data cache. For example, the provider may be enabled to specify a cache eviction policy for the provider-specific data cache, such that data objects are evicted from the provider-specific data cache in a manner specified by the provider (as opposed to, e.g., the default cache eviction policy implemented at the POP 112).

The interactions of FIG. 7 begin at (1), where a provider computing device 108B submits a request to the CDN manager 118 of the CDN 110 to reserve cache space on POPs 112 of the CDN 110. Illustratively, the request may include an amount of reserved cache space requested (e.g., n GB), as well as one or more POPs 112 on which the reserved cache space should be maintained (e.g., all POPs 112, only provider-designated POPs 112, etc.). The request may further include a custom cache eviction policy to be implemented for the reserved cache space. In one embodiment, the custom cache eviction policy may be selected by the provider computing device 108B from a list of potential cache eviction policies provided by the CDN manager 118, each of which corresponds to a cache eviction algorithm maintained at the various POPs 112. In another embodiment, the custom cache eviction policy may be generated partly or entirely by a provider (e.g., using the provider computing device 108B). For example, the custom cache eviction policy may correspond to a mathematical algorithm specified by the provider computing device 108B, or a set of computer-executable code provided by the provider computing device 108B to the CDN manager 118 that, when executed by the POPs 112, enables selection of data objects for eviction from with a provider-specific data cache implemented on the POPs 112.

At (2), the CDN manager 118 transmits instructions corresponding to the received requests to relevant POPs 112 (e.g., all POPs 112, POPs 112 designated in the request, etc.). Specifically, the CDN manager 118 transmit instructions to the POPs 112 to establish a provider-specific cache within the data stores 116 of the POPs 112, subject to the custom eviction policy specified by the provider computing device 108B.

After receiving the instructions, one or more edge servers 114 of each POP 112, at (3), may each allocate space within the data store 116 in which to implement the provider-specific cache. In one embodiment, the space allocated for a provider-specific cache may be split among the various edge servers 114 of a POP 112, such that each edge server 114 has access to a portion of the space allocated for the provider-specific cache. In other embodiments, the space allocated for the provider-specific cache may be generally available to all edge servers 114. Illustratively, the allocated space may generally be at least as large as the space requested by the provider, but may also be increased to account for over-utilization of the provider-specific cache (e.g., prior to eviction of data objects from the provider-specific cache). In some embodiments, the space allocated for the provider-specific cache may be thin-provisioned (a technique known in the relevant fields), thus enabling underlying physical memory within the data stores 116 to be utilized by the provider-specific cache only when actually needed to store data objects. In some embodiments, the memory space within the data stores 116 used to implement the provider-specific cache may be deallocated from a shared cache of the POPs 112 and repurposed to implement the provider-specific cache. In other embodiments, the memory space used to implement the provider-specific cache may be separate from the memory space used to implement a shared cache, such that implementation of the provider-specific cache does not adversely affect operation of the shared cache (and may in fact positively affect operation of the shared cache, due to lowered need to store data objects of the provider who has requested a provider-specific cache). Where additional memory space is needed within the data stores 116, edge servers 114 may increase the computing resources available to the data stores 116 by use of cloud computing services or other on-demand computing resources services in communication or associated with the POP 112.

At (4), one or more edge servers 114 of each POP 112 can place data objects of the provider associated with provider computing device 108B into the provider-specific cache for that provider. In one embodiment, edge servers 114 may place data objects into the provider-specific cache by moving these data objects from a shared cache into the provider-specific cache (e.g., as an independent operation executed at the edge servers 114). In another embodiment, the edge servers 114 may place data objects into the provider-specific cache during normal operations of the edge servers 114 to retrieve and return those data objects to end user computing devices 102. For example, the edge servers 114 may place data objects into the provider-specific cache when a cache miss for those data objects occurs, and those data objects are retrieved from an origin server 108. Thus, placement of data objects into the provider-specific cache may not substantially impact normal operation of the POP 112.

At (5), an edge server 114 may detect that the provider-specific cache is over-utilized (e.g., storing a total size of data objects that is over the reserved space requested by the provider). Accordingly, the edge server 114 may modify the provider-specific cache according to the custom eviction policy specified by the provider computing device 108B. For example, the edge server 114 may execute computer-executable code corresponding to the custom eviction policy (e.g., as generated by the CDN 110 or received from the provider computing device 108B) against a listing of data objects within the provider-specific cache, in order to select one or more of those data objects for eviction. Because these data objects are maintained separately from data objects within a shared cache of each POP 112, these data objects are generally not subject to the eviction policies of that shared cache. Accordingly, a given provider may utilize the interactions of FIG. 7 to establish a reserved cache space at each POP 112, such that data objects of other providers do not cause the given provider's data objects to be evicted from the POP 112.

Figure 8A:
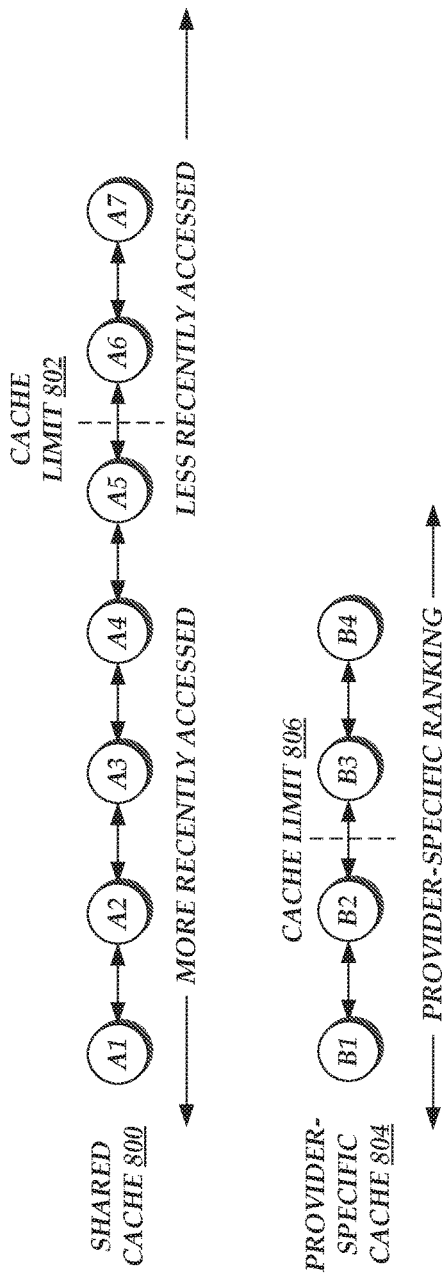
FIGS. 8A and 8B are illustrative graphical depictions or visualizations of a cache structure that can be implemented at a POP of FIG. 1 to create a provider-specific data case at the POP that utilizes a custom cache eviction policy.
Figure 8B:
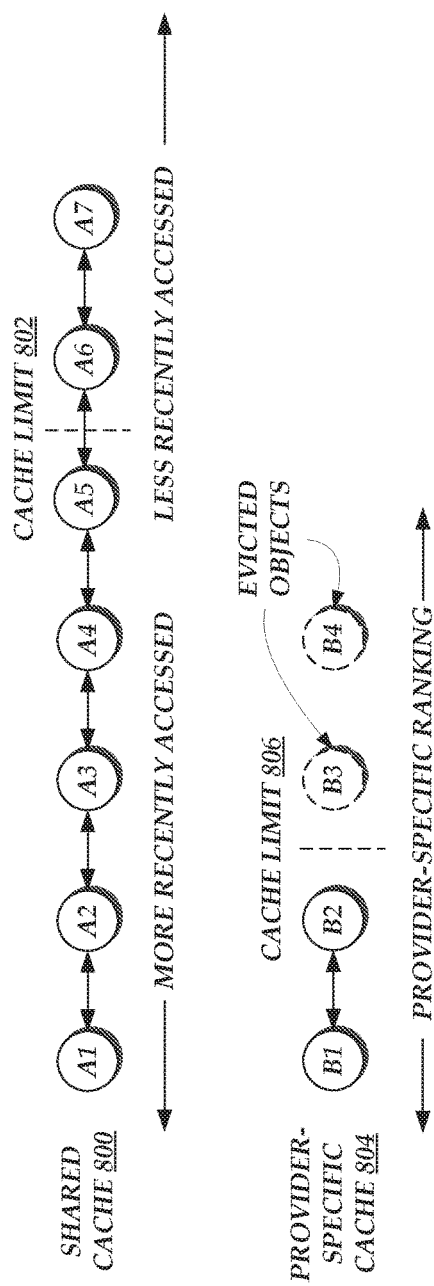

With reference to FIGS. 8A and 8B, graphical illustrations or visualizations will be described illustrating how a reserved cache space for a provider (provider 'B') may be established by implementing a provider-specific cache, distinct from a shared data cache (both of which may be implemented, e.g., within a data store 116 of the POPs 112 of FIG. 7). Specifically, FIG. 8A depicts various data objects within both a shared cache 800 and a provider-specific cache 804 prior to implementation of an eviction policy on the respective caches. FIG. 6B depicts various data objects within both the shared cache 800 and the provider-specific cache 804 after eviction.

As in the various figures above, the data objects of FIGS. 8A and 8B are labeled according to their respective provider as well as a number indicating their order within FIGS. 8A and 8B. Further, as in the figures above, the data objects of FIGS. 8A and 8B stored within the shared cache 600 are represented in order of recency of access by a doubly linked list (e.g., generated by an edge server 114 of FIG. 1), which identifies each data object, as well as a data object (if any) accessed more recently than the given data object and a data object accessed less recently that the given data object. Because the features of the shared cache 800 generally correspond to those of the shared cache 600, described with respect to FIGS. 6A and 6B, above, those features will not be described in detail with respect to FIGS. 8A and 8B.

Unlike the figures described above, FIGS. 8A and 8B also depict a provider-specific cache 804, which includes only data objects associated with provider B, for whom the provider-specific cache 804 was generated (e.g., at a POP 112). Illustratively, the data objects of the provider-specific cache 804 are maintained separately from the data objects in the shared cache 800, and are thus not depicted within the shared cache 800. Moreover, because the data objects within the provider-specific cache 804 are subject to a custom eviction policy, as specified by provider B, the arrangement of data objects within the provider-specific cache 804 does not necessarily follow the same structure as the arrangement of data objects within the shared cache 800, but may be ordered or ranked according to a provider-specific ranking (e.g., determined by the custom cache eviction policy selected by the provider). For example, rather than being ordered by recency of access, the data objects within the provider-specific cache 804 may be ordered (e.g., via a doubly linked list, hash, array, etc.) based on other rankings, such as based on a combination of recency of access and total size of the data objects (e.g., by dividing number of bytes of each data objects by milliseconds since the data object has been accessed at the CDN, and sorting the results). In some embodiments, the data objects within the provider-specific cache 804 may not be ordered or interconnected at all, such as where a random cache eviction policy is selected by provider B.

As shown in FIGS. 8A and 8B, the data objects within the provider-specific cache 804 are associated with a cache limit 806. Illustratively, the cache limit may be set based on the total desired size of data objects within the provider-specific cache 804 (e.g., n GB). As such, the cache limit 806 is specific to the provider-specific cache 804, and thus distinct from the cache limit 802 placed on the shared cache 800.

Because the total size of data objects within the provider-specific cache 804 exceeds the cache limit 806 for that provider-specific cache 804, an edge server 114 or other computing device implementing the data structures depicted in FIGS. 8A and 8B may apply a custom cache eviction policy to the provider-specific cache 804, as designated by provider B. Illustratively, the data objects within the provider-specific cache 804 may have previously ordered according to that custom cache eviction policy, based on any attributes of those data objects (e.g., recency of access, frequency of access, data size, a combination thereof, etc.). Accordingly, an edge server 114 may traverse the linked list of the provider-specific cache 804 in reverse order to repeatedly select a lowest ranked data object for eviction, until the total size of the provider-specific cache 804 no longer exceeds the cache limit 806. For example, as shown in FIG. 8B, an edge server 114 may select data objects B3 and B4 for eviction, subject to the custom cache eviction policy designated by provider B. Thus, a provider may be enabled select data objects for eviction from a provider-specific data cache according to a custom cache eviction policy. Moreover, by placing data objects into a provider-specific data cache, those data objects may be protected from a cache eviction policy of a shared data cache, thus enabling the data objects to be maintained at a POP 112 regardless of that shared cache eviction policy.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A content delivery system comprising:
   a non-transitory data store implementing a data cache to store data objects from at least two different providers providing content to the content delivery system, the data cache including a plurality of data objects previously accessed by end users of the content delivery system, wherein the plurality of data objects stored within the data cache includes data objects from the at least two different providers, the data cache further including information indicating a most recent access time for data objects of the plurality of data objects;

a computing device comprising a processor and memory, the processor configured with specific computer-executable instructions that, when executed, cause the processor to:

receive a request from a first provider of the plurality of providers to reserve a portion of the data cache on the content delivery system for data objects within the data cache associated with the first provider, wherein the portion is associated with a data size;

identify, from the plurality of data objects stored within the data cache including data objects from the at least two different providers, one or more most-recently-accessed data objects associated with the first provider, wherein a collective size of the one or more most-recently-accessed data objects is not more than the specified data size;

mark as protected from eviction the one or more most-recently-accessed data objects associated with the first provider within the data cache including data objects from the at least two different providers;

determine that a collective size of the plurality of data objects from the at least two different providers within the data cache exceeds a cache size limit;

identify, within the plurality of data objects from the at least two different providers, one or more least-recently-accessed data objects that are not marked as protected from eviction; and delete, from the data cache, the one or more least-recently-accessed data objects identified within the plurality of data objects from the at least two different providers.

2. The content delivery system of claim 1, wherein the specific computer-executable instructions, when executed, further cause the processor to:

receive a request for a first data object associated with the first provider;

determine that the first data object is not stored within the data cache;

retrieve the first data object from an external content source; and mark the first data object as protected from eviction.

3. The content delivery system of claim 2, wherein the specific computer-executable instructions, when executed, further cause the processor to:

determine that a collective size of the first data object and the previously identified one or more most-recently-accessed data objects associated with the first provider exceeds the specified data size;

identify, from the one or more most-recently-accessed data objects associated with the first provider, a least recently used data object; and mark the least recently used data object as not protected from eviction.

4. The content delivery system of claim 1, wherein the information indicating a most recent access time for data objects of the plurality of data objects comprises a doubly linked list identifying a relative recency of access between the data objects.

5. The content delivery system of claim 1, wherein the non-transitory data store further includes a doubly linked list identifying a relative recency of access between data objects associated with the first provider.

6. A computer-implemented method comprising:

implementing, within a memory, a data cache storing a plurality of data objects that were previously accessed by end users, wherein the data cache indicates a most recent access time for data objects of the plurality of data objects, and wherein the plurality of data objects stored within the data cache includes data objects from at least two different providers;

receiving a request to reserve a portion of the data cache for data objects within the data cache associated with a first provider of the at least two providers, wherein the portion is associated with a size;

identifying, from the plurality of data objects stored within the data cache including data objects from the at least two different providers, one or more data objects associated with the first provider that have been accessed more recently than other data objects associated with the first provider that are within the plurality of data objects wherein a collective size of the one or more data objects is not more than the size;

marking, within the data cache including data objects from the at least two different providers, the one or more data objects associated with the first provider as protected from eviction;

determining that a collective size of the plurality of data objects from the at least two different providers within the data cache exceeds a cache size limit;

identifying, within the plurality of data objects from the at least two different providers, at least one data object that is not marked as protected from eviction; and deleting, from the data cache, the at least one data object identified within the plurality of data objects from the at least two different providers.

7. The computer-implemented method of claim 6 further comprising:

receiving a request from a second provider of the at least two different providers to reserve a second portion of the data cache for data objects within the data cache associated with the second provider, wherein the second portion is associated with a second size;

identifying, from the plurality of data objects stored within the data cache including data objects from the at least two different providers, one or more data objects associated with the second provider that have been accessed more recently than other data objects associated with the second provider that are within the plurality of data objects, wherein a collective size of the one or more data objects associated with the second provider is not more than the second size; and marking, within the data cache including data objects from the at least two different providers, the one or more data objects associated with the second provider as protected from eviction.

8. The computer-implemented method of claim 6, wherein the cache size limit is at least one of an absolute size limit or a size limit relative to a total capacity of the data cache.

9. The computer-implemented method of claim 6, wherein the at least two different providers are among a plurality of providers providing content to a content delivery system.

10. The computer-implemented method of claim 6, wherein identifying, within the plurality of data objects from the at least two different providers, the at least one data object that is not marked as protected from eviction comprises identifying a least-recently-used data object within the data cache that is not marked as protected from eviction.

11. The computer-implemented method of claim 6 further comprising:
   receiving a request for a first data object associated with the first provider;
   determining that the first data object is not stored within the data cache;
   retrieving the first data object from an external content source; and
   marking the first data object as protected from eviction.

12. The computer-implemented method of claim 11 further comprising:
   determining that a collective size of the first data object and the previously identified one or more data objects associated with the first provider exceeds the size; and
   marking at least one of i) the first data object or ii) a data object from the one or more data objects associated with the first provider as not protected from eviction.

13. The computer-implemented method of claim 12, wherein marking at least one of i) the first data object or ii) a data object from the one or more data objects associated with the first provider as not protected from eviction comprising:
   identifying a least recently used data object from a group including the first data object and the one or more data objects associated with the first provider; and
   marking the least recently used data object as not protected from eviction.

14. Non-transitory computer-readable media including instructions executable by a computing device to:
   implement, within a memory, a data cache storing a plurality of data objects that were previously accessed by end users, wherein the data cache indicates access times for data objects of the plurality of data objects, and wherein the plurality of data objects stored within the data cache includes data objects from at least two different providers;
   obtain instructions to reserve a portion of the data cache for data objects within the data cache associated with a first provider of the at least two providers, wherein the portion is associated with a size;
   identify, from the plurality of data objects stored within the data cache including data objects from the at least two different providers, one or more data objects associated with the first provider, wherein a collective size of the one or more data objects is not more than the size;
   mark, within the data cache including data objects from the at least two different providers, the one or more data objects associated with the first provider as protected from removal;
   determine that a collective size of the plurality of data objects from the at least two different providers within the data cache exceeds a cache size limit;
   identify, within the plurality of data objects from the at least two different providers, at least one data object that is not marked as protected from removal; and
   delete, from the data cache, the at least one data object identified within the plurality of data objects from the at least two different providers.

15. The non-transitory computer-readable media of claim 14, wherein the instructions are executable by the computing device to identify the one or more data objects associated with the first provider based at least partly on identification of which data objects associated with the first provider have been most-recently-accessed in the data cache.

16. The non-transitory computer-readable media of claim 14, wherein the instructions are further executable by the computing device to:
   obtain instructions to reserve a second portion of the data cache for data objects within the data cache associated with a second provider of the at least two providers, wherein the second portion is associated with a second size;
   identify, from the plurality of data objects stored within the data cache including data objects from the at least two different providers, one or more data objects associated with the second provider, wherein a collective size of the one or more data objects is not more than the second size; and
   mark the one or more data objects associated with the second provider as protected from eviction.

17. The non-transitory computer-readable media of claim 14, wherein the instructions are executable by the computing device to identify, within the plurality of data objects from the at least two different providers, the at least one data object that is not marked as protected from eviction at least partly by identifying a least-recently-used data object within the data cache that is not marked as protected from eviction.

18. The non-transitory computer-readable media of claim 14, wherein the instructions are further executable by the computing device to:
   obtain a request for a first data object associated with the first provider;
   determine that the first data object is not stored within the data cache;
   retrieve the first data object from an external content source; and
   mark the first data object as protected from eviction.

19. The non-transitory computer-readable media of claim 18, wherein the instructions are further executable by the computing device to:
   determine that a collective size of the first data object and the previously identified one or more data objects associated with the first provider exceeds the size; and
   mark at least one data object selected from i) the first data object or ii) the one or more data objects associated with the first provider as not protected from eviction.

20. The non-transitory computer-readable media of claim 18, wherein the at least one data object selected from i) the first data object or ii) the one or more data objects associated with the first provider represents the least recently used data object in a group consisting of i) the first data object and ii) the one or more data objects associated with the first provider represents.

* * * * *